United States Patent
Li et al.

(10) Patent No.: US 12,526,887 B2
(45) Date of Patent: Jan. 13, 2026

(54) DRIVER ARRANGEMENT FOR A LIGHT EMITTING ARRANGEMENT

(71) Applicant: SIGNIFY HOLDING B.V., Eindhoven (NL)

(72) Inventors: Zhaoting Li, Shanghai (CN); Xiaolin Chen, Shanghai (CN); Zhengyu Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 34 days.

(21) Appl. No.: 18/716,554

(22) PCT Filed: Dec. 5, 2022

(86) PCT No.: PCT/EP2022/084461
§ 371 (c)(1),
(2) Date: Jun. 5, 2024

(87) PCT Pub. No.: WO2023/110503
PCT Pub. Date: Jun. 22, 2023

(65) Prior Publication Data
US 2025/0040009 A1    Jan. 30, 2025

(30) Foreign Application Priority Data

Dec. 13, 2021 (WO) ................ PCT/CN2021/137570
Jan. 27, 2022 (EP) ..................................... 22153677

(51) Int. Cl.
*H05B 45/20* (2020.01)
*H05B 45/24* (2020.01)

(52) U.S. Cl.
CPC .................................. *H05B 45/20* (2020.01)

(58) Field of Classification Search
None
See application file for complete search history.

(56) References Cited

U.S. PATENT DOCUMENTS

| | | | |
|---|---|---|---|
| 10,595,371 B2 * | 3/2020 | Zeng | .......................... F21S 4/22 |
| 2007/0052376 A1 | 3/2007 | Lee | |
| 2010/0072903 A1 * | 3/2010 | Blaut | ..................... H05B 45/20 |
| | | | 315/307 |
| 2014/0049186 A1 | 2/2014 | Fortini et al. | |
| 2014/0191670 A1 | 7/2014 | Liang | |
| 2015/0338268 A1 | 11/2015 | Ramer et al. | |
| 2016/0174316 A1 * | 6/2016 | Hori | ....................... H05B 45/24 |
| | | | 315/186 |
| 2018/0206305 A1 | 7/2018 | Van Winkle | |
| 2021/0305978 A1 | 9/2021 | Chen | |

* cited by examiner

*Primary Examiner* — Anh Q Tran

(57) ABSTRACT

A driver arrangement for a light emitting arrangement. The driver arrangement comprises two driver circuits. The power output by each driver circuit is controlled by a respective control loop. A control system comprises a single manual switch device that is switchable between multiple switch positions. Switching between different positions simultaneously changes which, if any, of one or more setting components form part of each control loop. Changing which setting component(s) forms part of a control loop changes or controls the power output by a respective driver circuit.

15 Claims, 7 Drawing Sheets

DRIVER ARRANGEMENT FOR A LIGHT EMITTING ARRANGEMENT

CROSS-REFERENCE TO PRIOR APPLICATIONS

This application is the U.S. National Phase application under 35 U.S.C. § 371 of International Application No. PCT/EP2022/084461, filed on Dec. 5, 2022, which claims the benefit of European Patent Application No. 22153677.4, filed on Jan. 27, 2022 and International Application No. PCT/CN2021/137570, filed on Dec. 13, 2021. These applications are hereby incorporated by reference herein.

FIELD OF THE INVENTION

The present invention relates to the field of driver arrangements, and in particular to driver arrangements for outputting two sources of power.

BACKGROUND OF THE INVENTION

In the field of light emitting arrangements, there is a desire to provide color-temperature adjustable lamps, that are able to output light of different color temperatures. Some existing 3-steps color-temperature adjustable light emitting arrangements comprise one constant current converter and two output channels, i.e., two LED arrangements. One of these LED arrangements outputs high color-temperature, the output outputs low color-temperature. 3-steps color-temperature change is realized by a DIP switch, which can be operated in four different modes to thereby control current flow through the LED arrangements in four different ways: no current flow at all; all current flows through high color-temperature LED arrangements; all current flows through low color-temperature LED arrangements; or split the current across the two LED arrangements. This kind of control mechanism is only suitable for 3-steps color-temperature adjustment and should not be used on 5- or more steps color-temperature adjusting approaches. This is because any further control would require additional LED arrangements, significantly increasing the cost and size of the overall light emitting arrangement.

Another way to tune color-temperature is to change a number of resistors connected in series with each LED arrangement by controlling a DIP switch. A change in the number of resistors leads to a change of current flowing through each LED arrangement, thereby adjusting color-temperature accordingly. However, this method is not power efficient because, due to the power loss resulting from connecting additional resistors in series. Moreover, the accuracy of the color-temperature is low because of LED's diode characteristic, which means that a small forward voltage (VF) differences (e.g. due to natural manufacturing variation and/or aging of the diode, e.g. leading to moisture ingress or thermal shock) can lead to a significant current difference and therefore a big color-temperature variation. It is therefore a complex task to guarantee a 5-steps precise color-temperature adjustment using this approach.

An alternative approach, e.g. proposed by US20150338268A1, is to use more than one LED driver, each one driving a different LED one LED string, and using a DIP switch to control each LED driver. This approach employs digital control, using uses a microcontroller unit (MCU) to detect DIP switch's position and control each driver's output current according to a mapping table. This control method is complicated, expensive and requires more resource because an MCU is needed.

There is therefore a desire to provide a new approach that facilitates accurate, precise and resource-efficient control over the operation of a light emitting arrangement.

SUMMARY OF THE INVENTION

The invention is defined by the claims.

Embodiments propose an approach in which a single manual switch device simultaneously controls the power provided by two driver circuits of a driver arrangement. Even further, the control is done in an analog manner by tuning the control loop of the driver circuit directly via a setting component, instead of using detection, mapping and controlling involving digital component. More specifically, the single manual switch device controls which (if any) of a set of one or more setting components/elements, such as resistors, form part of a control loop of each driver circuit. The proposed approach is particularly advantageous for light emitting arrangements having LED arrangements of different color temperatures, which are powered by a respective driver circuit. In particular, compared with prior art in which each of the two driver circuits comprises its own tuning interface and the user needs to tune the two interfaces to set a respective output of each of the two driver circuit, the proposed mechanism provides an intuitive and cost effective mechanism in which the user just needs to manipulate the single switch to set the respective output of each of the two driver circuits, thereby facilitating control over the output of the driver circuits for providing consistent and resource-efficient color-temperature adjustment. As seen from the user perspective, the invention as a whole is a one-click setting for both driver circuits, substantially different from making respective settings for both driver circuits.

According to examples in accordance with an aspect of the invention, there is provided a driver arrangement for a light emitting arrangement comprising: a first driver circuit and a second driver circuit, each configured to provide power to a respective load: a first control loop configured to control the power provided by the first driver circuit and a second control loop configured to control the power provided by the second driver circuit; a control system comprising: one or more setting components that, when connected to a selected one of the control loops, set an amplitude of the power provided by the driver circuit as controlled by the selected one of the control loops; and a single manual switch device configured to control an electrical connection between the one or more setting components and each control loop, wherein the single manual switch device is configured to switchable between at least a first switch position and a second switch position, wherein switching between the first switch position and the second switch positions simultaneously changes the setting components connected to the first and second control loops, such that the first driver circuit provides a first output and the second driver circuit provides a second output when the single manual switch device is in the first switch position, and the first driver circuit provides a third output different from the first output and the second driver circuit provides a fourth output different from the second output when the single manual switch device is in the second switch position.

The proposed mechanism makes use of a single manual switch device to control the number and/or characteristics of any setting components connected to a control loop for each of two or more driver circuits in the driver arrangement. The single manual switch device thereby facilitates a mechanism for controlling the magnitude of power output by each driver circuit. It is to be understand that, for many applications, it is not necessary to provide every possible combination of two driver circuits' settings for the user, and a set of some proposed selected combination is sufficient. More specifically, the combinations of the first/second outputs and the third/fourth outputs are two selected combinations (which may prove useful for a user), whereas a combination of first/fourth or third/second outputs may be excessive for the user and can be discarded (e.g. the mechanism may not facilitate such combinations). Further examples below will give more details.

This approach provides a resource-efficient mechanism for controlling the power output by each driver circuit, and thereby drawn by loads connected to each driver circuit. This can be used to appropriately control power drawn by respective LED arrangements (e.g. acting as loads).

Optionally, when in the first switch position, the single switch device connects a first set of the one or more setting components to the first control loop and a second set of the one or more setting components to the second control loop; and when in the second switch position, the single switch device connects a third set, different from the first set, of the one or more setting components to the first control loop and a fourth set, different from the second set, of the one or more setting components to the second control loop.

Each of the sets of setting components may be different or may overlap. For instance, the second and third sets may be the same and the first and fourth sets may be the same. In another example, components may be shared between different sets of the setting components.

In some examples, the first output is larger than the third output, and the second output is smaller than the fourth output thereby the outputs of the first driver circuit and the second driver circuit being complementary.

This example facilities the user operation. In the prior art, which uses respective interface for two driver circuits, in case complementary outputs are needed, the user needs to turn up one driver circuit via one interface and turn down the other driver circuit via the other interface. By using this example, the user can do those settings in one go via operating the single manual switch from the first position to the second position.

In some examples, each setting component comprises a sensing component adapted to sense a value of the output of the driver associated with the control loop to which the sensing component is connected; and switching of the position of the single manual switch device causes a simultaneous change in the total impedance of the respective sensing components connected to each control loop.

By changing the resistance of the sensing component, the effective output as seen by the control loop is changed and the control loop can be set to different output. This example is easy to implement.

In some embodiments, each setting component comprises a biasing component to a dimming terminal of the control loop to which the setting component is connected; and switching of the position of the single manual switch device causes a change in the total impedance of the respective biasing components connected to each control loop. Even further, the total impedance of any biasing components connected to a control loop may be adapted to set a reference value of the output of the driver circuit associated with said control loop.

This embodiment provides an alternative implementation to set the output by changing the reference value of the control loop. For the control loop, especially IC having a dimming terminal, adjusting the dimming terminal to adjust the output is relative stable for the control loop.

Optionally, the one or more setting components comprise one or more resistors; and switching of the position of the single manual switch device changes which, if any, resistors are connected to each control loop.

Using resistors as the setting component is low cost. Resistors are also easier to be switched.

In some embodiments, the one or more setting components comprises a common setting resistor; and the single manual switch device is adapted to: connect said common setting resistor to the first control loop and isolate said common setting resistor from the second control loop when in the first switch position; and connect said common setting resistor to the second control loop and isolate said common setting resistor from the first control loop when in the second switch position.

In this implementation, a setting component is selectively coupled to either the first driver circuit or the second driver circuit, thus it uses fewer setting components to achieve the complementary output of the first and second driver circuits.

In at least one embodiment, the one or more setting components comprise two series resistor arrangements, and the single manual switch is adapted to switch where each control loop taps to a respective one of the two series resistor arrangements.

This implementation uses respective/independent setting components for the two driver circuit. One advantage is that the values of the setting component for respective driver circuits can be configured independently, thus the absolute value of the output of each driver circuit can be set freely from the other driver circuit.

In some examples, the one or more setting components comprises a plurality of different setting resistors; and the single manual switch device is adapted to: connect a first group of one or more of the different setting resistors to the first control loop and isolate a second, different, group of one or more of the different setting resistors from the second control loop when in the first switch position; and isolate the first group of one or more different setting resistors from the first control loop and connect the second group of one or more different setting resistors to the second control loop when in the second switch position.

This example gives a specific way of switching the setting components for the two control loops.

In some embodiments, the one or more setting components comprises, for each control loop, a fixed portion that is fixed to the respective control loop and not switchable by the single manual switch device and a variable portion that is adapted to be switchable to the respective control loop by the single manual switch device.

This embodiment has a fixed setting component portion not switchable, thus two control loops have at least the fixed portion to make its output continuous during the switching, and the driver circuit would not enter protection or stop operation during switching of the setting component.

Optionally, the first control loop comprises a first protection terminal; the second control loop comprises a second protection terminal; and the single manual switch device is further adapted to control, in the second switch position, an impedance at the first protection terminal to a level that the control loop of the first driver is adapted to enter a protection mode and thereby provide the substantially zero third output to its respective load, and control, in the first switch position, an impedance at the second protection terminal to a level that the control loop of the second driver is adapted to enter a protection mode and thereby provide the substantially zero second output to its respective load.

In order to achieve a single output from one driver circuit, the other driver circuit needs to be turned off. But for some driver circuit without a standby control terminal, it is not easy to turn it off. Many control loops especially ICs have a protection terminal originally designed to be triggered by abnormal conditions such as overtemperature, and the driver circuit would enter protection mode/stop operation. This optional embodiment effectively turns off the driver circuit by manipulating the protection terminal and making the control loop enter a protection mode.

Optionally, each driver circuit is configured to convert power from a mains power supply to a DC current for driving a respective LED arrangement, and the first control loop is configured to control the current provided by the first driver circuit and the second control loop is configured to control the current provided by the second driver circuit.

This optional example controls the current which determines the LED output lumen directly, thus this optional example is more suitable for driving LED for general lighting/illumination purpose.

There is also proposed a light-emitting arrangement comprising: the driver arrangement previously described; and a first LED arrangement configured to be powered by the first driver circuit; and a second LED arrangement configured to be powered by the second driver circuit.

In some embodiments, the first LED arrangement is configured to output light of a first color temperature and the second LED arrangement is configured to output light of a second, different, color temperature.

For a light-emitting arrangement with adjustable color temperature, in many applications the user prefers to simply select one of a few typical color points, instead of having the complexity to select one among all possible color points. Thus, the present embodiment can facilitate design of switching of the setting components to provide respective outputs at the few color points, and the user can switch the light-emitting arrangement to one of the few typical color points. This saves the user's cumbersome operation.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
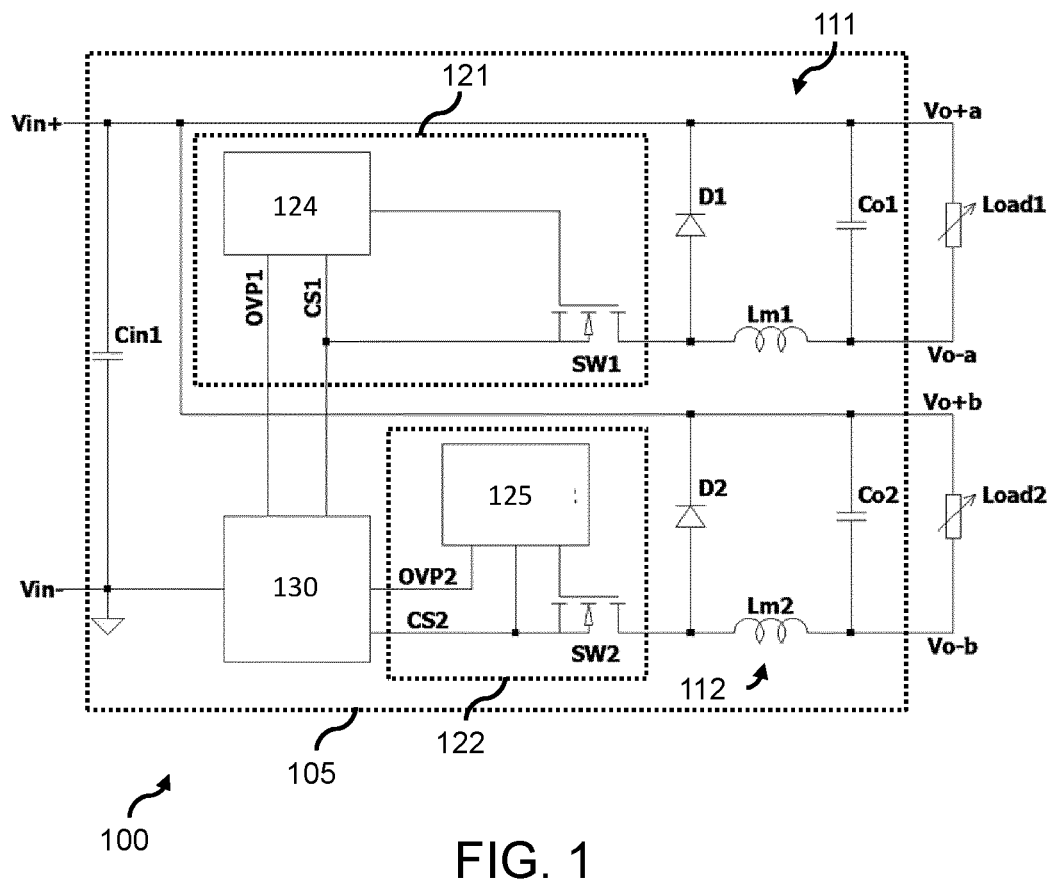
FIG. 1 illustrates a light emitting arrangement according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a driver arrangement for a light emitting arrangement. The driver arrangement comprises two driver circuits. The power output by each driver circuit is controlled by a respective control loop. A control system comprises a single manual switch device that is switchable between multiple switch positions. Switching between different positions simultaneously changes which, if any, of one or more setting components form part of each control loop. Changing which setting component(s) forms part of a control loop changes or controls the power output by a respective driver circuit. Thus by switching the single manual switch device, the output of the two driver circuits is adjusted simultaneously. Note that the driver arrangement may comprise more than two driver circuits, which would also fall into the scope of the claims since the driver arrangement already comprises two driver circuits if it comprises more than two driver circuits.

Embodiments introduce one or more setting components that can be connected to separate control loops, each of which control the power provided by a respective driver circuit. Proposed approaches use a single manual switch device to facilitate simultaneous control of the outputs provided by the driver circuits, e.g. to control their outputs in a complementary way.

In particular examples, as later described, the setting components are controllable to: change two driver circuit's output current in a complementary way, e.g. such that the total output current is relatively stable/constant while the output of the two driver circuits are opposite in term of amplitude; change two driver circuit's output current simultaneously; and/or disable one driver circuit and enable another, or enable both simultaneously.

The setting components may be interchangeably connected to the control loop, and the single switch device may be configured such that changing the setting components connected to one control loop simultaneously changes the setting components connected to another control loop. In this way, the parameters of each control loop (e.g. a bias voltage, reference voltage or the like) are controlled at a same time.

FIG. 1 illustrates a first use-case scenario for an embodiment of the invention.

In particular, FIG. 1 illustrates a light-emitting arrangement 100, comprising a driver arrangement 105.

The driver arrangement 105 comprises a first driver circuit 111 and a second driver circuit 112, each configured for converting a power provided at an input Vin+, Vin− to a power as an output. Here, each driver circuit comprises a buck converter, the operation of which is well known to the skilled person. Thus, each driver circuit 111, 112 comprises a diode D1, D2, an inductor Lm1, Lm2, and a capacitor Co1, Co2, appropriately connected in the form of a conventional buck converter. Other suitable driver circuits could be used, such as a boost converter or a buck-boost converter.

Each driver circuit 111, 112 provides power to a respective load Load1, Load2. In particular, the first driver circuit 111 provides a first power via Vo+a, Vo−a to a first load Load1, and the second driver circuit 112 provides a second power via Vo+b, Vo−v to a second load Load2. Since the loads are LEDs, the first and second power are preferably regulated in term of current, via the terminals CS1 and CS2.

For a light-emitting arrangement, the loads Load1, Load2 are respective LED arrangements, each of which is powered by a respective driver circuit 111, 112. In some scenarios, each LED arrangement may be configured to output light of a different color or color temperature.

Each driver circuit 111, 112 may be configured to convert power from a mains power supply to a DC current for driving a respective LED arrangement.

The driver arrangement 105 further comprises a first control loop 121 and a second control loop 122. Each control loop controls the power, more specifically the current, provided by a respective driver circuit 111, 112. In the illustrated example, this is achieved by a respective controller 124, 125 controlling the operation of a switch SW1, SW2 that itself controls the operation of the driver circuit.

Various control schemes for a control loop are known. Generally, each control loop is responsive to a voltage provided by at least one terminal or pin.

In this example, each control loop is responsive to a voltage at a respective sensing pin CS1, CS2 (here: a current sensing pin) that provides/defines a sensing signal. In particular, the voltage of the sensing signal provides feedback for an electrical current output by the driver circuit that is controlled by the respective control loop. The voltage at the sensing pin CS1, CS2 (i.e. the sensing signal) may represent a current provided by a driver circuit associated with the control loop. In particular, the voltage at a particular sensing pin may be a voltage across a sensing impedance arrangement, through which the current output by a driver circuit. The sensing impedance arrangement connects between a sensing pin CS1, CS2 and a ground/reference voltage (GND).

The present disclosure proposes the use of a control system 130, which comprises one or more setting components and a single manual switch device. The control system 130 is configured to bias or modify the voltage at the sensing pins CS1, CS2.

The setting component(s) of the control system are configured such that, when connected to (or disconnected from) a particular control loop, they change the amplitude of the power provided by the driver circuit (to a respective load) associated with that control loop to which the setting components are connected.

The single manual switch device is configured to control an electrical connection between the setting component(s) and the control loops, and is able to simultaneously change which setting component(s) is/are connected to the first and second control loops. In this way, the single manual switch device simultaneously controls which setting components contribute to, or form part of, each control loop.

In the illustrated example, the control system 130 functions by facilitating simultaneous modification of the impedance of a sensing impedance arrangement for the first control loop and a sensing impedance arrangement for the second control loop. This is performed by the control system 130 controllably changing which setting components contribute to or form the sensing impedance arrangement for each control loop. In particular, the control system controls which setting components electrically connect to (i.e. so as to allow current to flow to/from) the sensing terminal CS1, CS2 of each control loop. This approach facilitates control over the current output by each driver circuit.

The control system 130 thereby controls a connection (specifically, an impedance) between the two sensing terminals/pins CS1, CS2 of the respective control loops 121, 122 and a ground/reference voltage. The sensing terminals CS1, CS2 provide/define a voltage of a respective sensing signal that controls or sets the operation of the respective control loop.

This effectively means that control over the current output by each driver circuit can be achieved by modifying or adjusting the impedance of a sensing impedance arrangement used for each control loop. Embodiments propose to make use of the control system 130 to modify the impedance of the sensing impedance arrangement. This can be achieved, for instance, by controlling which setting components are connected to the control loop, via the sensing terminals CS1, CS2, to thereby control an impedance of a sensing impedance arrangement.

By way of further explanation, for the driver arrangement illustrated in FIG. 1, the current $I_{o1}$, $I_{o2}$ output by a driver circuit 111, 112 has a negative relationship with the impedance Rcs1, Rcs2 of a sensing impedance arrangement associated with the control loop and a positive relationship with a reference voltage Vref, as demonstrated in the below equation:

$$I_{ox} = \frac{V_{ref}}{Rcsx} \quad (1)$$

where x is replacable by "1" for the first driver circuit 111 and "2" for the second driver circuit 112.

Thus, modifying the impedance of the impedance sensing arrangement for a control loop facilitates control of an output of a driver circuit associated with said control loop.

In the context of the present disclosure, controlling whether a setting component is connected to a control loop means to control whether current is able to flow through that setting component from the control loop or vice versa. Thus, connecting a setting component to a control loop may make the setting component part of the control loop, and disconnecting the setting component from the control loop may remove the setting component from the control loop.

The setting component(s) may also be able to control a voltage at protection terminals OV1, OV2 of the driver circuit(s). Each protection terminal, such as originally for overvoltage or over temperature protection, may be used as an effective enable/disable circuit of the control loop/driver circuit. Embodiments of this sort can be used to control when an overvoltage protection circuit is activated, e.g. even during non-overvoltage conditions, which can allow for control of the output of each driver circuit (e.g. control an output to provide negligible or zero current). Examples of this approach will be described later in this disclosure.

Figure 2:
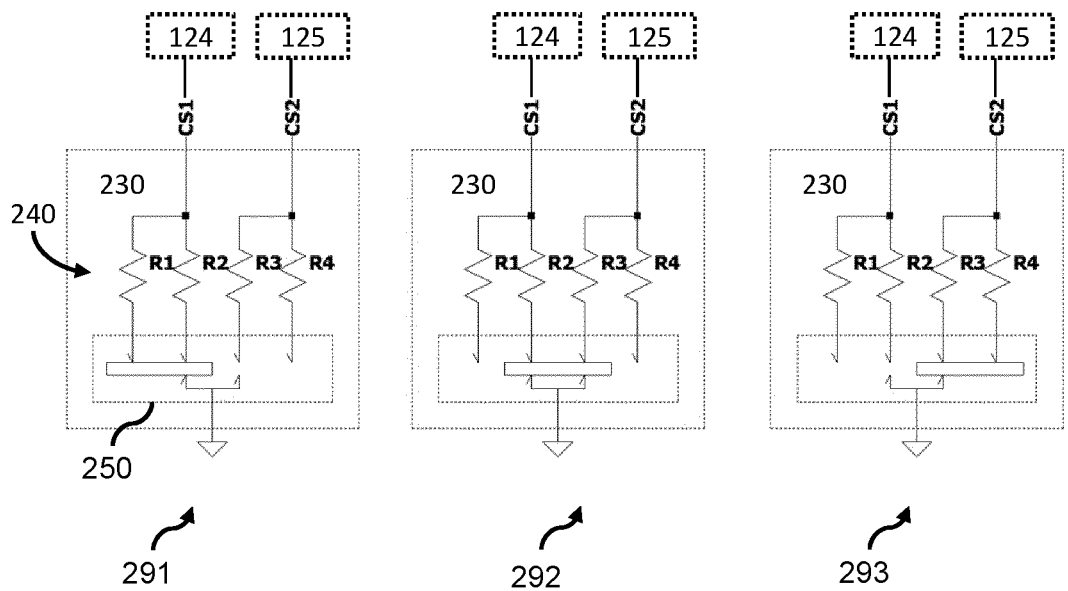
FIG. 2 illustrates a control system for use in an embodiment.

FIG. 2 illustrates a control system 230 for use in embodiments of the invention, such as in the use-case scenario illustrated in FIG. 1. The control system is connected to each control loop, and is configured to modify characteristics of the control loop to thereby control characteristics of power output by the associated driver circuit(s). The control system 230 comprises a plurality of setting components 240, which here each comprise a respective resistor R1, R2, R3, R4.

The control system 230 comprises a single manual switch device 250. The single manual switch device is configured to controllably select which resistors are electrically connected to (i.e. conduct power of) each control loop. This effectively controls the impedance of an impedance sensing arrangement. The single manual switch device is thereby configured to control an electrical connection between the one or more setting components and each control loop.

The single manual switch device 250 the device may be a button, a rotary knob, a slide switch, or any other mechanical device that is able to simultaneously control and change which setting components contribute to each control loop. In the illustrated example, the single manual switch device 250 comprises a slide switch like device, i.e. a conductive object, which can be moved to change the connection of the resistors between (the sensing terminal of) each control loop and ground (GND). The conductive object can be made using/from any electrically conductive material, e.g. metals such as copper or iron. An electrically conductive material may be one used to conduct electricity in domestic appliances.

This example of a single manual switch device may be employed in any herein described embodiment. Differences from this single manual switch device for other embodiments will be highlighted, and the materials and construction of such other single manual switch devices may be otherwise identical to the above-described single manual switch device 250.

The single manual switch device is configured to be manually switchable between multiple switch positions. Changing between each switch position simultaneously changes which setting components (if any) are connected to both control loops via the sensing terminals CS1, CS2, i.e. changes which setting components (if any) contribute to each control loop. In this way, changing between each switch position simultaneously changes the outputs provided by the driver circuits.

In this way, the single manual switch device 250 controls an impedance (Rcs1, Rcs2) between each controller 124, 125 and ground (GND) by controlling which of the resistors R1, R2, R3, R4 connects to each controller 124, 125. Each resistor R1, R2, R3, R4 effectively can be connected to or isolated from each control loop dependent upon the position of the single manual switch device.

FIG. 2 illustrates three switch positions for a single manual switch device. When in a first switch position 291, a first resistor R1 and second resistor R2 are connected (in parallel) to the first control loop and no resistors are connected to the second control loop. In a second switch position 292, only the second resistor R2 connects with the first control loop and a third resistor R3 connects with the second control loop. In a third switch position 293, no resistors are connected to the first control loop, and the third resistor R3 and a fourth resistors R4 are connected (in parallel) to the third control loop.

For the sake of further understanding, consider a scenario in which the control system 230 is used as the control system 130 for the driver arrangement illustrated in FIG. 1, R1=R2=R3=R4=R and the total output current Io.

In this scenario, in the first switch position 291, R1, R2 are connected in parallel and connected to GND, i.e., Rcs1=R1//R2=0.5*R. Moreover, in the first switch position, R3, R4 are open, such that Rcs2=+∞. In this case, Io1=Vref/Rcs1=2*Vref/R, Io2=Vref/Rcs2=0, wherein the control loop of the second driver circuit may enter an open load mode. To sum up, the total output is all provide through the first load, say first LED, and the total output current Io=Io1+Io2=2*Vref/R.

In the same scenario, in the second switch position 292, R1 is open, R2 is connected to GND, i.e., Rcs1=R2=R. Moreover, in the second switch position, R3 is connected to GND, R4 open, such that Rcs2=R3=R. In this case, Io1=Vref/Rcs1=Vref/R, Io2=Vref/Rcs2=Vref/R. Thus, the total output is half through the first load, say first LED, and through from the second load, say second LED, and the total output current Io=Io1+Io2=2*Vref/R.

In the same scenario, in the third switch position 293, R1, R2 are open, i.e. Rcs1=+∞. Moreover, in the third switch position, R3, R4 in connected in parallel and connected to GND, Rcs2=R3//R4=0.5*R. In this case, Io1=Vref/Rcs1=0 wherein the control loop of the first driver circuit may enter an open load mode, Io2=Vref/Rcs2=2*Vref/R. Thus, the total output is all through the second load, say second LED, and the total output current Io=Io1+Io2=2*Vref/R.

Thus, the total current output Io by the combination of both drivers can be kept constant, whilst changing the current provided by each driver separately. Of course, it will be appreciated that the total output current Io can be different by configuring R1, R2, R3 and R4 at least partially different.

Figure 3:
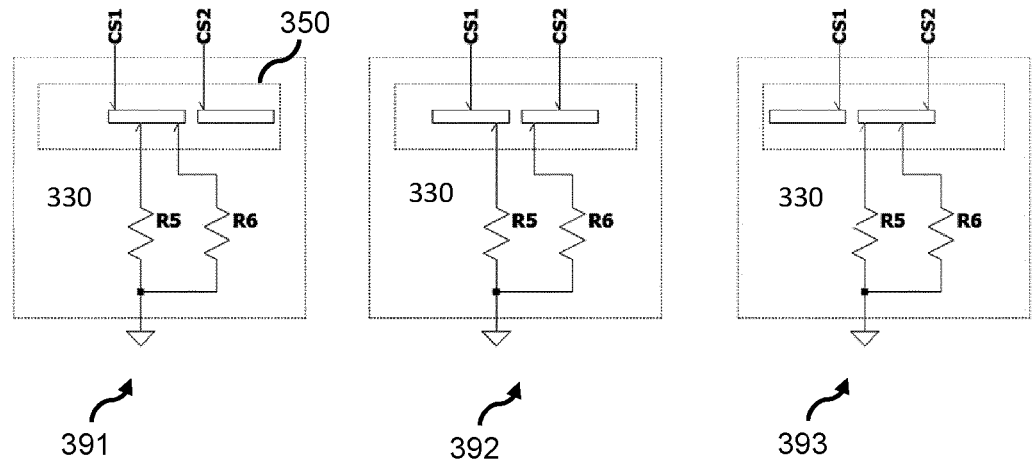
FIG. 3 illustrates a control system for use in another embodiment.

FIG. 3 illustrates another control system 330 for use in embodiments of the invention, such as in the use-case scenario illustrated in FIG. 1. The control system 330 operates on a similar principle to the control system 230 illustrated in FIG. 2 while the main difference is that the setting component can be shared by the two driver circuits at different time. Such setting components may be labelled "common setting components".

In this embodiment, the single manual switch device 350 comprises a split slide switch like device, i.e. a split conductive object, which can be moved to change the connection of the resistors between (the sensing pin of) each control loop and ground (GND) based on its position. Examples of suitable conductive objects have been previously described.

Assuming that the control system 330 is used as the control system 130 for the driver arrangement illustrated in FIG. 1, R5=R6=R and the total output current Io, then the following operational understanding may be achieved.

When the single manual switch device is a first switch position 391, a first R5 and second R6 resistor are connected (in parallel) to the first control loop and no resistors are connected to the second control loop. Thus, Rcs1=R5//R6=0.5*R; Rcs2=+∞. In this case, Io1=Vref/Rcs1=2*Vref/R, Io2=Vref/Rcs2=0, and the total output current Io=Io1+Io2=2*Vref/R.

In a second switch position 392, only the first resistor R5 connects with the first control loop and the second resistor R6 connects with the second control loop. In this way, Rcs1=R5=R; Rcs2=R6=R. Thus, Io1=Vref/Rcs1=Vref/R, Io2=Vref/Rcs2=Vref/R, and the total output current Io=Io1+Io2=2*Vref/R.

In a third switch position 393, no resistors are connected to the first control loop, and the first and second resistors are connected (in parallel) to the second control loop. In this way, Rcs1=+∞; Rcs2=R3/R4=0.5*R. In this case, Io1=Vref/Rcs1=0, Io2=Vref/Rcs2=2*Vref/R, and the total output current Io=Io1+Io2=2*Vref/R.

As before, in any of the switch positions, it will be appreciated that the total output current Io can be different if R5≠R6.

Figure 4:
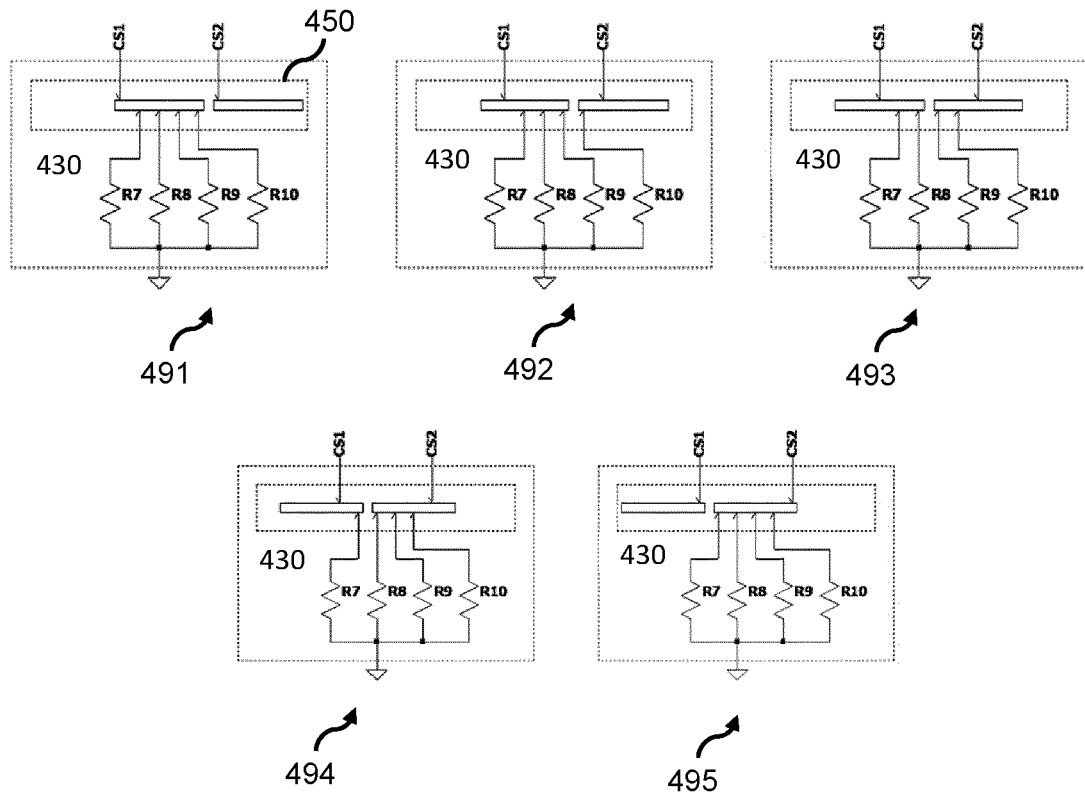
FIG. 4 illustrates a control system for use in another embodiment.

FIG. 4 illustrates another control system 430 for use in embodiments of the invention, such as in the use-case scenario illustrated in FIG. 1.

The control system 430 operates on a similar principle to the control system 330 illustrated in FIG. 3, but it able to provide 5, not just 3, different combinations of sensing impedance arrangements, i.e. there are five different switching positions for the single manual switch device.

The control system comprises four resistors, R7, R8, R9, R10. Different sets of these resistors can be selectively introduced to each control loop. If R7=R8=R9=R10, then the total output current Io is constant.

In a first switch position 491 of the single manual switch device 450, all four resistors form part of the first control loop and are disconnected from the second control loop. In a second switch position 492, three resistors form part of the first control loop and only one resistor forms part of the second control loop. In a third switch position 493, two resistors form part of the first control loop, and two resistors form part of the second control loop. In a fourth switch position 494, only one resistor forms part of the first control loop, and three resistors form part of the second control loop. In a fifth switch position 495, all resistors are disconnected from the first control loop and instead form part of the second control loop only.

In a modification to the control systems of any of FIGS. 2 to 4, a respective resistor (arrangement) may be connected to permanently form part of each control loop. This approach can be adopted if it is not necessary for either driver circuit to provide zero output current. This permanently connected resistor also make the control loop stable during the switching. For example, this can prevent controller and/or driver circuit failure, because if current flows through an impedance arrangement is abruptly stopped during operation of the driver circuit, then a high voltage will appear at the output of the driver circuit which could damage the driver controller and/or the driver circuit.

Thus, the one or more setting components may comprises, for each control loop, a fixed portion that is fixed to the respective control loop and not switchable by the single manual switch device and a variable portion that is adapted to be switchable to the respective control loop by the single manual switch device.

Figure 5:
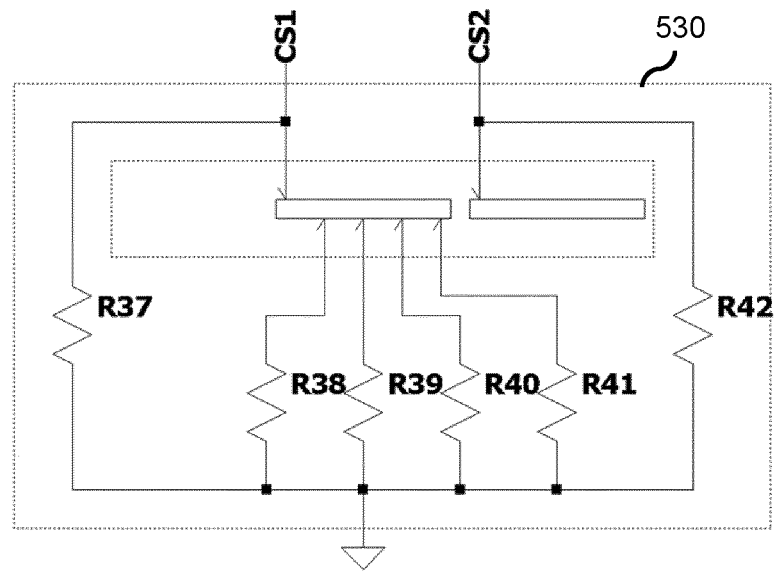
FIG. 5 illustrates a control system for use in another embodiment.

FIG. 5 illustrates a control system 530 produced when this variation is applied to the control system of FIG. 4. In this example, resistor R37 always connect to the first control loop and R42 always connects to the second control loop. In this embodiment, the sensing terminals CS1 and CS2 will never be open, then Io1 and Io2 cannot be lowered to zero.

Thus, resistor R37 acts as a fixed portion for a first control loop and resistor R42 acts as a fixed portion for a second control loop. The remaining resistors, R38, R39, R40, R41 act as a variable portion for each control loop, such that connections between the variable portion and each control loop can be controlled by switching the position of the single manual switch device.

In FIG. 5, if R37=R38=R39=R40=R41=R42, and total output current is Io, then (if equation (1) applies) the output current of the first control loop (controlled via sensing pin CS1) can be Io/6, Io/3, Io/2, 2Io/3 or 5Io/6.

It has previously been mentioned how the setting component(s), and the control system more widely, can be used to control the operation of an overvoltage protection circuit for the control loop(s).

Referring back to FIG. 1, the first control loop 121 may comprise a first protection terminal OVP1 (which carries a first overvoltage protection signal). The second control loop 122 may comprise a second protection terminal OVP2 (which carries a second overvoltage protection signal).

As previously discussed, it is preferred to prevent sensing terminals CS1 or CS2 from floating (or being kept open) when the driver circuits are active (i.e. powered). Current flows through the sensing terminals CS1, CS2 that, if stopped abruptly, would result in high voltage appearing at CS1, CS2, which could damage or destroy the controller(s) of the drive circuit(s). In general practice, a sensing terminal of a control loop (i.e. input to a controller) is a low voltage pin on a controller and can withstand less than 10V voltage.

To allow the electrical current output by either driver circuit to fall to zero when the driver arrangement is powered-on, it is proposed to make use of existing overvoltage protection circuits. Typical control loops, especially IC for a driver circuit include an overvoltage protection terminal, the voltage at which can make the control loop/driver circuit to enter protection and stop operation, effectively control whether the control loop is enabled or disabled (more specifically, whether the controller of the control loop is enabled or disabled).

In many cases, the voltage (VOVP) at an overvoltage terminal (OVP) of an output loop has either a positive relationship (VOVP=X*ROVP) or negative relationship (VOVP=X/ROVP) with OVP resistance (being the resistance between the OVP terminal and ground). By tuning or controlling the OVP resistance, OVP can be triggered during a "normal" state, i.e. when there is actually no overvoltage provided to the driver arrangement. In this way, Io1=0 or Io2=0 can be realized during normal operation of the driver arrangement.

Figure 6:
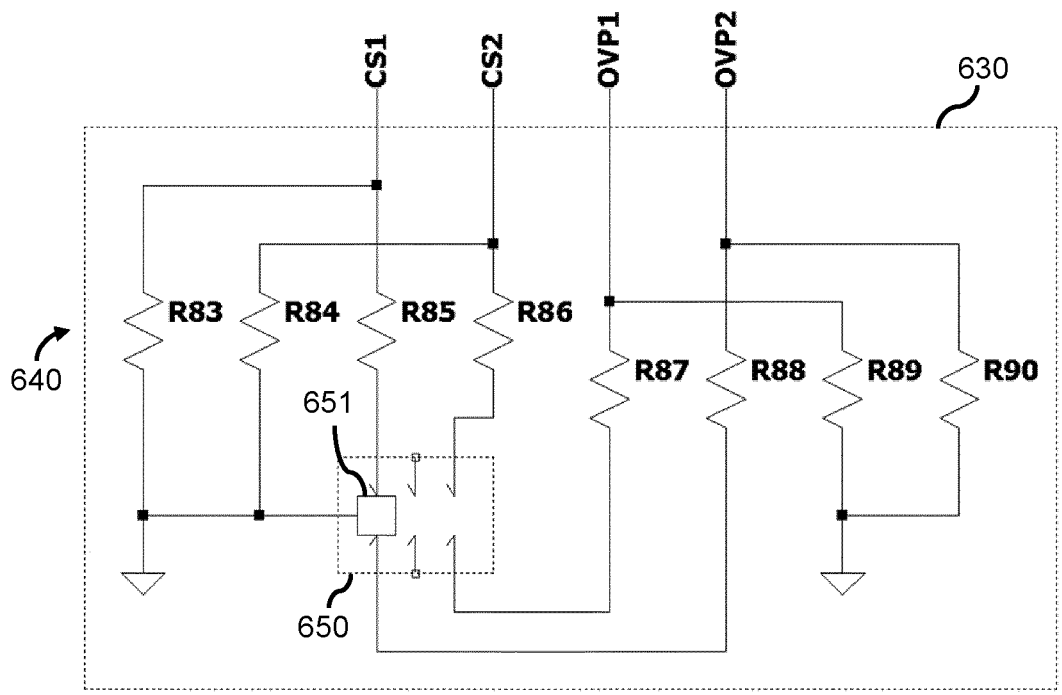
FIG. 6 illustrates a control system for use in another embodiment.

One approach for controlling the OVP resistance is illustrated in FIG. 6, which operates under the assumption that VOVP=X*ROVP.

FIG. 6 illustrates a control system 630 for use in an embodiment of the invention. The control system again comprises a plurality of setting components 640 and a single manual switch device 650.

The single manual switch device comprises a moveable element 651 (illustrated as a square) which is always coupled to the ground, and is switchable among the three pairs of terminals noted by arrows, wherein it can interconnect a selected pair of terminals to the ground. The moveable element is an example of a conductive object.

A first group of the setting components (comprising resistors R85, R86) can be selectively connected to different sensing terminals CS1, CS2 (i.e. to allow or prevent current flowing from/to the setting components from said sensing terminal(s)). In particular, a single manual switch device can control which of the first group of setting components allows current flow to/from the sensing terminal(s).

A second group of the setting components can be selectively electrically connected to the protection (OVP) terminals to thereby control the OVP resistance at each OVP terminal. In particular, the second group of setting components are configured such that two resistors (connected to the first OVP1 and second OVP2 protection terminals respectively) can be configured to selectively/controllably provide a current path to ground. When a resistor is configured to provide a current path to ground, the OVP resistance at the OVP is set to cause overvoltage protection to trigger.

If it is assumed that R83=R84=R85=R86=R, then there are 3 possible switch positions.

In a first switch position wherein the moveable element 651 is at the left side as shown in the FIGS. 6, R85 and R88 are connected to the ground, Rcs1=R83//R85=0.5*R, and Io1=Io; ROVP2=R88//R90, (which causes OVP2 to become triggered) and Io2=0. In a second switch position wherein the moveable element 651 is moved to the middle, it is float, Rcs1=R83=R, Io1=0.5*Io; Rcs2=R84=R, Io2=0.5*Io. In this instance, for the second switch position, both OVP1 and OVP2 not triggered. In a third switch position wherein the moveable element 651 is moved to the right, R86 and R87 are connected to the ground, ROVP1=R87//R89, OVP1 triggered, and Io1=0; Rcs2=R84//R86=0.5*R, and Io2=Io.

Previous embodiments have demonstrated approaches in which setting components comprise resistors that controllably/selectively contribute to a sensing impedance arrangement for a control loop. This is achieved by selectively connecting resistors, in parallel with one another, between a sensing terminal and a ground voltage.

However, embodiments may be adapted such that resistors may be selectively connected in series with one another, between a sensing terminal and a ground voltage.

Figure 7:
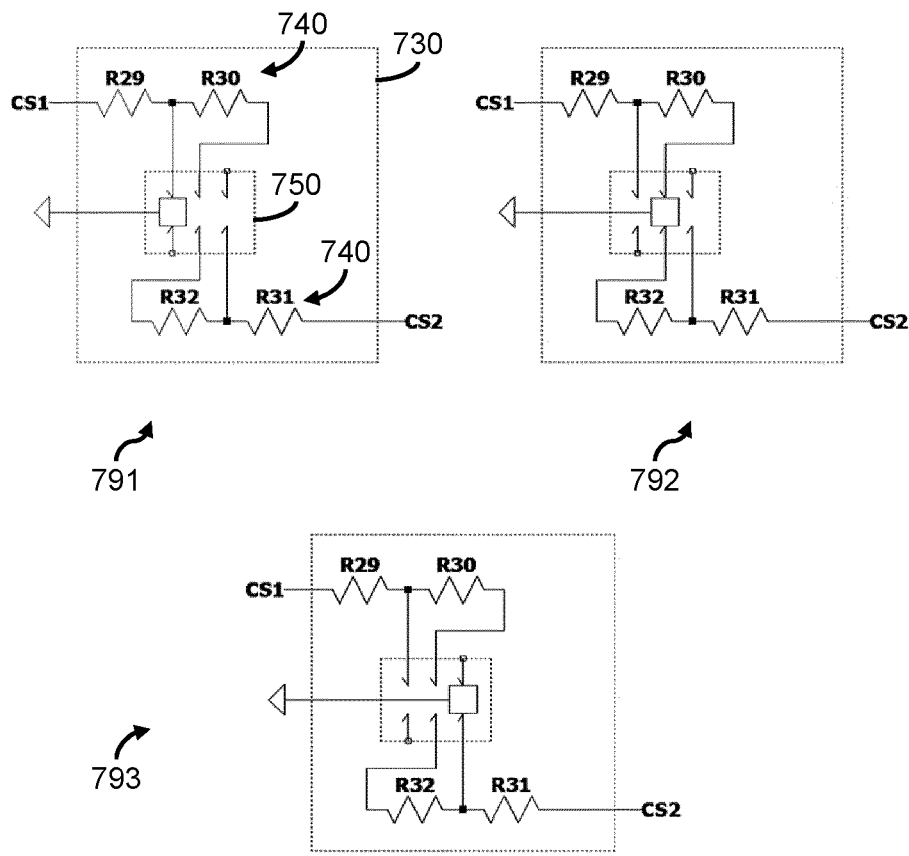
FIG. 7 illustrates a control system for use in another embodiment.

FIG. 7 illustrates an embodiment of a control system 730 that adopts this approach. The control system again comprises a plurality of setting components 740 and a single switch device 750.

The plurality of setting components 740 here comprises two series of resistors. The first series of resistors R29, R30 can be selectively electrically connected to the first sensing terminal CS1 and the second series of resistors R31, R32 can be selectively electrically connected to the second sensing terminal. In each case, either none, some or all of the resistors (of each series of resistors) is electrically connected to the sensing terminals.

The single switch device is configured to simultaneously change how many resistors, in the respective series connection, are connected in series between each sensing terminal and a ground voltage. This is achieved using a slide switch that changes to which tap in the series of resistors the ground voltage is connected, where different taps represent a different number of resistors connecting the sensing terminal to the said tap.

In a first switch position 791 in the top left drawing of FIG. 7, R29 connects CS1 and GND, Rcs1=R; CS2 is open, Rcs2=+∞. In this case, Io1=Vref/R, Io2=0, and the total output current Io=Io1+Io2=Vref/R.

In a second switch position 792 in the top right drawing of FIGS. 7, R29 and R30 connects CS1 and GND, Rcs1=R29+R30=2R; R31 and R32 connects CS2 and GND, Rcs2=R31+R32=2R. In this case, Io1=0.5*Vref/R, Io2=0.5*Vref/R, total output current Io=Io1+Io2=Vref/R.

In a third switch position in the bottom drawing of FIG. 7, CS1 is open, Rcs1=+∞; R31 connects CS2 and GND, Rcs2=R. In this case, Io1=0, Io2=Vref/R, total output current Io=Io1+Io2=Vref/R.

The values set out above assumed that all resistor values are equal. It will be appreciated that the total output current Io is not constant if the following is not true: R29=R30=R31=R32.

Figure 8:
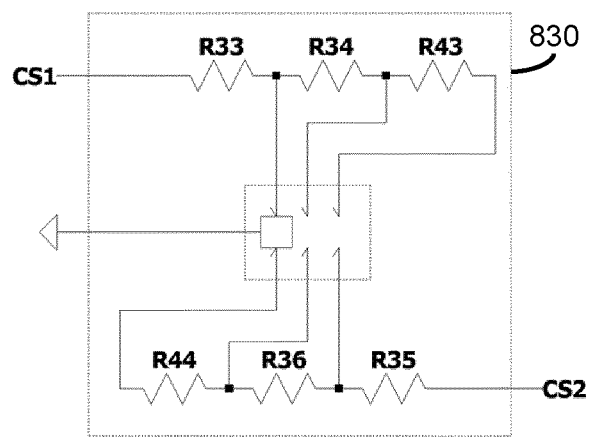
FIG. 8 illustrates a control system for use in another embodiment.

FIG. 8 illustrates a variation to the control system of FIG. 7, in which the control system 830 is configured so that at least one resistor (of the control system) always connects the sensing terminal CS1, CS2 of each control loop to ground Resistors R33 and R35 are permanently providing a path from CS terminal to ground.

This embodiment avoids abrupt stopping of current flow from the sensing terminals CS1, CS2 through the control system, which could lead to an abrupt high voltage occurring at the output of the driver circuit.

Figure 9:
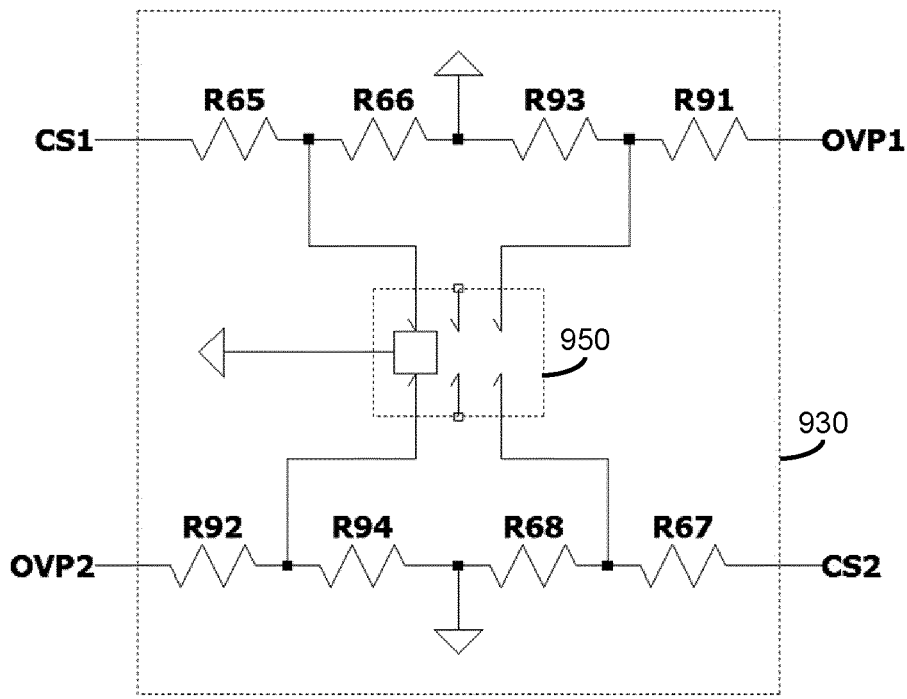
FIG. 9 illustrates a control system for use in another embodiment.

FIG. 9 illustrates a variation to the series-resistor embodiments previously described, which has been adapted to make use of overvoltage protection systems in the control loop(s) to facilitate a driver circuit outputting zero/negligible current without causing a sensing terminal to float.

As previously mentioned, it is preferable that the sensing terminals CS1, CS2 are not able to float (i.e. become open) when the drive arrangement is powered. However, there may still be a desire to change Io1 or Io2 to zero. To facilitate this desire, OVP terminals can be used. More specifically, by controlling OVP resistance (i.e. a resistance between the OVP terminal and a ground voltage), overvoltage protection (and turning off of the driver circuit) can be triggered during normal/conventional operation of the driver arrangement, hence Io1=0 or Io2=0 can be realized.

FIG. 9 illustrates such an embodiment of a control system 930, in which a single manual switch device 950 is configured to simultaneously control a resistance provided at each sensing terminal CS1, CS2 and each OVP terminal OVP1, OVP2. The single manual switch device here forms a switch (e.g. a conductive piece of material) moveable between three switch positions.

In the scenario that R65=R66=R67=R68=R, in a first switch position (e.g. where the switch is at a leftmost position), Rcs1=R65=R, ROVP1=R91+R93, Io1=Io and OVP1 is not triggered; meanwhile ROVP2=R92, OVP2 triggered, and Io2=0. In a second switch position, e.g. when the switch is at middle position, Rcs1=R65+R66=2*R, Io1=0.5*Io; meanwhile Rcs2=R67+R68=2*R, Io2=0.5*Io. Both OVP1 and OVP2 not triggered. In a third switch position, e.g. when the switch is at right position, ROVP1=R91, OVP1 triggered, Io1=0; meanwhile Rcs2=R67=R, ROVP2=R92+R94, OVP2 is not triggered, Io2=Io.

Figure 10:
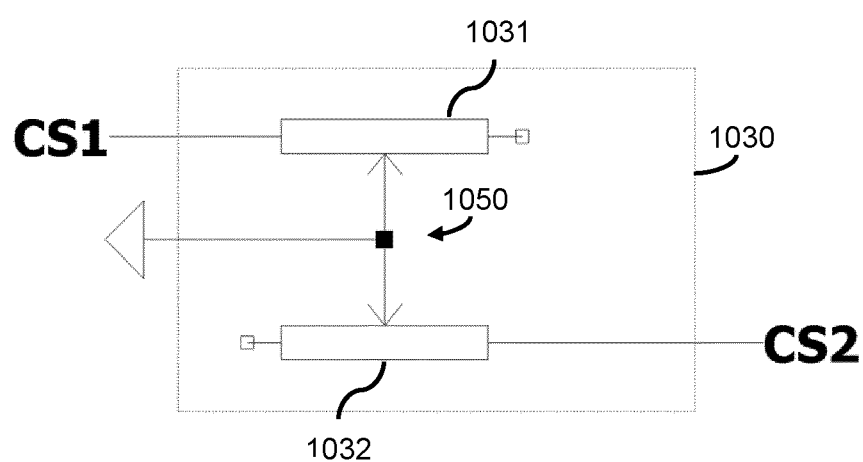
FIG. 10 illustrates a control system for use in another embodiment.

FIG. 10 illustrates another control system 1030 according to an embodiment. The control system 1030 differs from previously described control systems in that a respective rheostat 1031, 1032 is used to control the resistance between each sensing terminal CS1, CS2 and a ground voltage. Thus, the one or more setting components here comprise a rheostat connected between each sensing terminal and ground.

The single manual switch device 1050 controls the resistance provided by each rheostat. In particular, the single manual switch device is moveable between a plurality (e.g. an infinite or continuous) number of positions, which define the resistance provided by each rheostat, between the sensing pin CS1, CS2 and ground. The single manual switch device is configured so that moving the position along one rheostat simultaneously changes the position along the other rheostat.

The rheostats may be configured such that there is an increase in resistance (between a sensing pin and ground) provided by one rheostat whilst there is a decrease in resistance of the other rheostat (between the other sensing pin and ground). This provides simultaneous control and, for light-emitting arrangements in which the loads are LED arrangements of different light temperature, provides a continuous spectrum of light temperature combinations.

The rheostats may be replaced by any other suitable variable resistive element, such as a potentiometer.

The previous embodiments have been described in the context of a driver arrangement comprising control loops that control a driver circuit based on a current output by the driver circuit, e.g. a voltage at a (current) sensing terminal.

However, other forms of control loops are known.

For instance, some control loops are configured to control a voltage output by a driver circuit based on a voltage at a dimming pin (where the voltage at the dimming pin is not dependent upon current output by a load).

Figure 11:
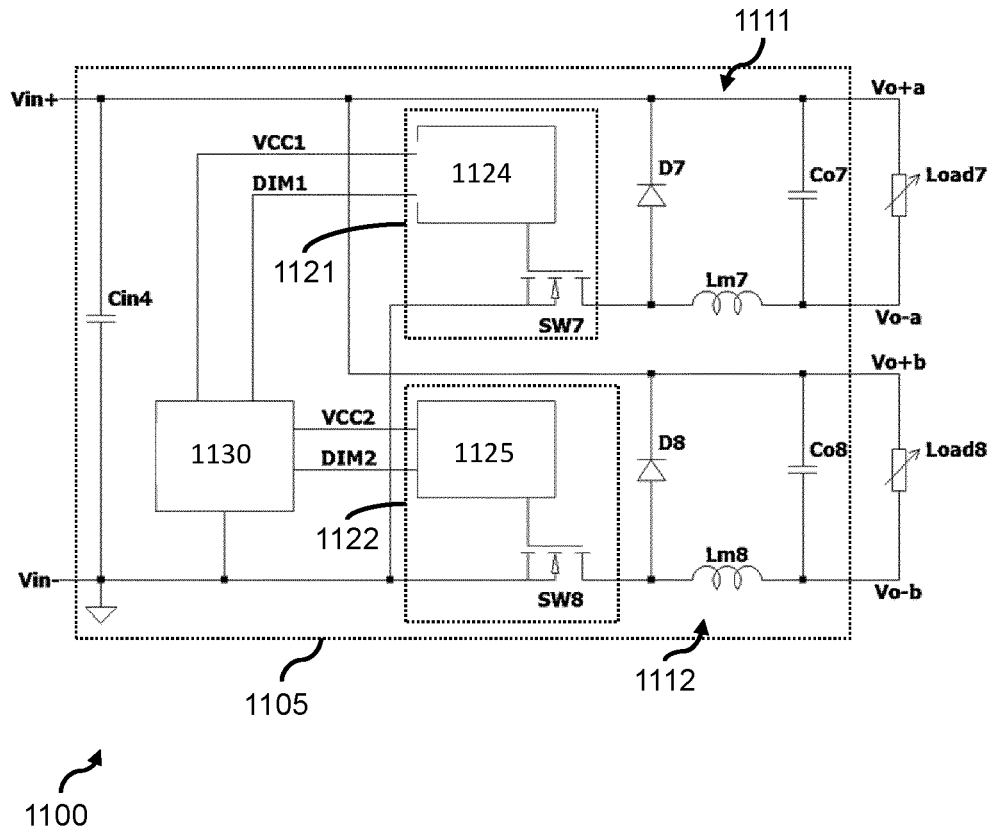
FIG. 11 illustrates another light emitting element according to an embodiment.

FIG. 11 illustrates a light emitting arrangement 1100 having a driver arrangement 1105 comprising two control loops 1121, 1122 that operate using this principle. A controller 1124, 1125 of each control loop 1121, 1122 controls the operation of a driver circuit 1111, 1112 associated with each control loop. Each control loop comprises a respective dimming terminal DIM1, DIM2. The voltage at the dimming terminal DIM1, DIM2 (e.g. with respect to a high voltage VCC1, VCC2) sets the output of the driver circuit 1111, 1112 associated with the respective control loop 1121, 1122. Thus, the output of a driver circuit 1111, 1112 is responsive to the voltage at a dimming terminal DIM1, DIM2.

It will be appreciated that the voltage at the dimming terminal DIM1, DIM2 can be controlled by controlling an impedance of an impedance arrangement connected to the dimming terminal. In particular, if the voltage at the dimming terminal DIM1, DIM2 is set using a voltage divider, formed up an upper impedance arrangement (connected between a high voltage and the dimming terminal) and a lower impedance arrangement (connected between the dimming terminal and a ground voltage, then modifying the impedance of either impendence arrangement will change the voltage provided at the dimming arrangement.

A control system 1130 may thereby be used to control the voltage at each dimming terminal.

Figure 12:
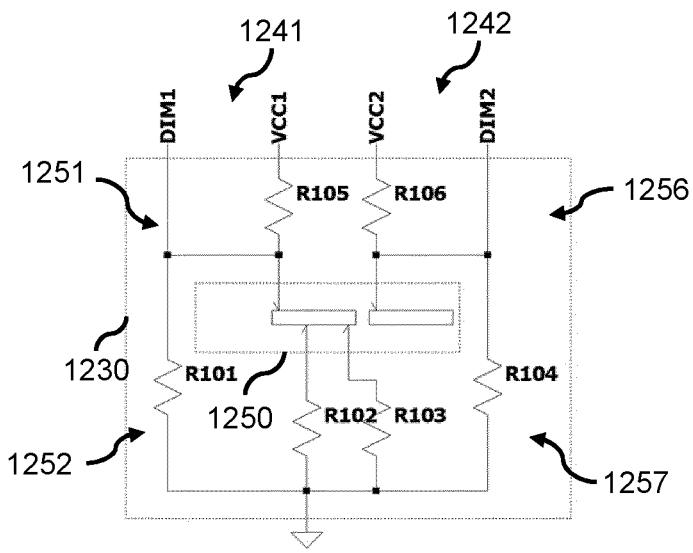
FIG. 12 illustrates a control system for use in an embodiment.

FIG. 12 illustrates an example of a suitable control system 1230 for controlling the voltage at the dimming terminals DIM1, DIM2. The control system is configured to simultaneously modify a voltage at both dimming terminals, to thereby simultaneously control a power provided by the associated driver circuit.

More specifically, the control system 1230 comprises a first voltage divider 1241 and a second voltage divider 1242.

The first voltage divider 1241 is formed up a first upper impedance arrangement 1251 connected between a high voltage VCC1 and the first dimming terminal DIM1 and a first lower impedance arrangement 1252 connected between the first dimming terminal DIM1 and a ground voltage.

The second voltage divider 1242 is formed up a second upper impedance arrangement 1256 connected between a high voltage VCC2 and the second dimming terminal DIM2 and a second lower impedance arrangement 1257 connected between the second dimming terminal DIM2 and a ground voltage. The high voltages VCC1, VCC2 may be identical.

The control system 1230 is configured to (simultaneously) control the impedance of the first 1251 and second 1257 lower impedance arrangements, thereby changing the voltage provided at each dimming terminal.

In this example, the control system 1230 comprises two resistors R102, R103, and controls, via a single manual switch device 1250, to which lower impedance arrangement each resistor contributes. The single manual switch device 1250 comprises a sliding element which is configured to, in different positions, provide different combinations for the lower impedance arrangements.

In a first position as shown in FIG. 12, resistors R102, R103 are connected in parallel with resistor R101 between the first dimming terminal and the ground voltage. In this first position, resistor R104 alone is connected between the second dimming terminal and the ground voltage.

In a second position, resistor R102 is connected in parallel with resistor R101 between the first dimming terminal and the ground voltage. In this second position, resistor R103 is connected in parallel with resistor R104 between the second dimming terminal and the ground voltage.

In a third position, resistors R102, R103 are connected in parallel with resistor R104 between the second dimming terminal and the ground voltage. In this third position, resistor R101 alone is connected between the first dimming terminal and the ground voltage.

Each position provides different combinations of resistance for the lower impedance arrangements of the voltage dividers. This causes different voltages to be present at the dimming terminals for each position, thereby facilitating control over the dimming voltage, and thereby the power output by the driver circuit controlled responsive to the dimming voltage.

Figure 13:
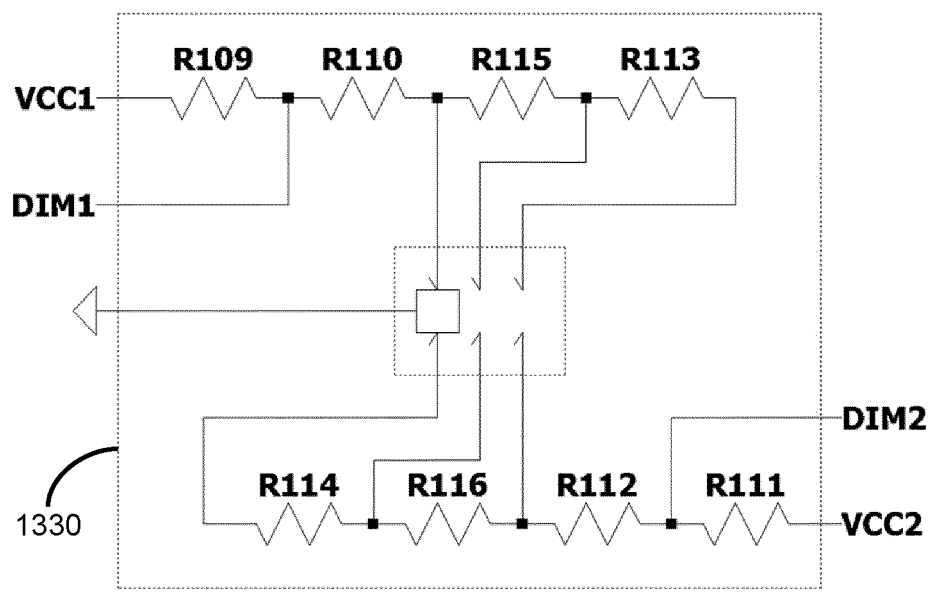
FIG. 13 illustrates a control system for use in another embodiment.

Another example of a suitable control system 1330 is shown in FIG. 13. The control system 1330 differs from the control system 1230 in that, rather than selectively connecting different resistors in parallel for each switch position, the control system 1330 selectively connects different resistors in series, a selected tap of the series resistor being connected to ground thereby effectively adjusting the voltage division ratio between the voltage at DIM terminal and the voltage VCC.

Equation (1) demonstrates how a reference voltage Vref is used to define the output current of a driver circuit. It is therefore possible to control the power output by a driver circuit by controlling or changing the value of the reference voltage Vref (e.g. at a reference voltage terminal for the control loop).

The control systems illustrated in FIGS. 12 and 13 could be repurposed to modify a voltage at a reference voltage terminal for the control loop. The operation of the control systems is similar, and is therefore not repeated for the sake of conciseness.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A driver arrangement for a light emitting arrangement comprising:
   a first driver circuit and a second driver circuit, each configured to provide power to a respective load;
   a first control loop configured to control the power provided by the first driver circuit and a second control loop configured to control the power provided by the second driver circuit;
   a control system comprising:
   one or more setting components that, when connected to a selected one of the control loops, set an amplitude of the power provided by the driver circuit as controlled by the selected one of the control loops; and a single manual switch device configured to control an electrical connection between the one or more setting components and each control loop, wherein the single manual switch device is configured to switchable between at least a first switch position and a second switch position, wherein switching between the first switch position and the second switch positions simultaneously changes the setting components connected to the first and second control loops, such that the first driver circuit provides a first output and the second driver circuit provides a second output when the single manual switch device is in the first switch position, and the first driver circuit provides a third output different from the first output and the second driver circuit provides a fourth output different from the second output when the single manual switch device is in the second switch position.

2. The driver arrangement of claim 1, wherein:
when in the first switch position, the single switch device connects a first set of the one or more setting components to the first control loop and a second set of the one or more setting components to the second control loop; and
when in the second switch position, the single switch device connects a third set, different from the first set, of the one or more setting components to the first control loop and a fourth set, different from the second set, of the one or more setting components to the second control loop.

3. The driver arrangement of claim 1, wherein the first output is larger than the third output, and the second output is smaller than the fourth output thereby the outputs of the first driver circuit and the second driver circuit being complementary.

4. The driver arrangement of claim 1, wherein:
each setting component comprises a sensing component adapted to sense a value of the output of the driver associated with the control loop to which the sensing component is connected; and
switching of the position of the single manual switch device causes a simultaneous change in the total impedance of the respective sensing components connected to each control loop.

5. The driver arrangement of claim 1, wherein:
each setting component comprises a biasing component to a dimming terminal of the control loop to which the setting component is connected; and
switching of the position of the single manual switch device causes a change in the total impedance of the respective biasing components connected to each control loop.

6. The driver arrangement of claim 5, wherein the total impedance of any biasing components connected to a control loop is adapted to set a reference value of the output of the driver circuit associated with said control loop.

7. The driver arrangement of claim 1, wherein:
the one or more setting components comprise one or more resistors; and
switching of the position of the single manual switch device changes which, if any, resistors are connected to each control loop.

8. The driver arrangement of claim 1, wherein:
the one or more setting components comprises a common setting resistor; and the single manual switch device is adapted to:
connect said common setting resistor to the first control loop and isolate said common setting resistor from the second control loop when in the first switch position; and
connect said common setting resistor to the second control loop and isolate said common setting resistor from the first control loop when in the second switch position.

9. The driver arrangement of claim 1, wherein the one or more setting components comprise two series resistor arrangements, and the single manual switch is adapted to switch where each control loop taps to a respective one of the two series resistor arrangements.

10. The driver arrangement of claim 1, wherein:
the one or more setting components comprises a plurality of different setting the single manual switch device is adapted to:
resistors; and
connect a first group of one or more of the different setting resistors to the first control loop and isolate a second, different, group of one or more of the different setting resistors from the second control loop when in the first switch position; and
isolate the first group of one or more different setting resistors from the first control loop and connect the second group of one or more different setting resistors to the second control loop when in the second switch position.

11. The driver arrangement of claim 1, wherein:
the one or more setting components comprises, for each control loop,
a fixed portion that is fixed to the respective control loop and not switchable by the single manual switch device and
a variable portion that is adapted to be switchable to the respective control loop by the single manual switch device.

12. The driver arrangement of claim 1, wherein:
the first control loop comprises a first protection terminal;
the second control loop comprises a second protection terminal; and
the single manual switch device is further adapted to
control, in the second switch position, an impedance at the first protection terminal to a level that the control loop of the first driver is adapted to enter a protection mode and thereby provide the substantially zero third output to its respective load, and
control, in the first switch position, an impedance at the second protection terminal to a level that the control loop of the second driver is adapted to enter a protection mode and thereby provide the substantially zero second output to its respective load.

13. The driver arrangement of claim 1, wherein each driver circuit is configured to convert power from a mains power supply to a DC current for driving a respective LED arrangement, and the first control loop is configured to control the current provided by the first driver circuit and the second control loop is configured to control the current provided by the second driver circuit.

14. A light-emitting arrangement comprising:
the driver arrangement of claim 13; and
a first LED arrangement configured to be powered by the first driver circuit; and
a second LED arrangement configured to be powered by the second driver circuit.

15. The light-emitting arrangement of claim 14, wherein the first LED arrangement is configured to output light of a first color temperature and the second LED arrangement is configured to output light of a second, different, color temperature.

* * * * *